UNITED STATES PATENT OFFICE 2,119,182

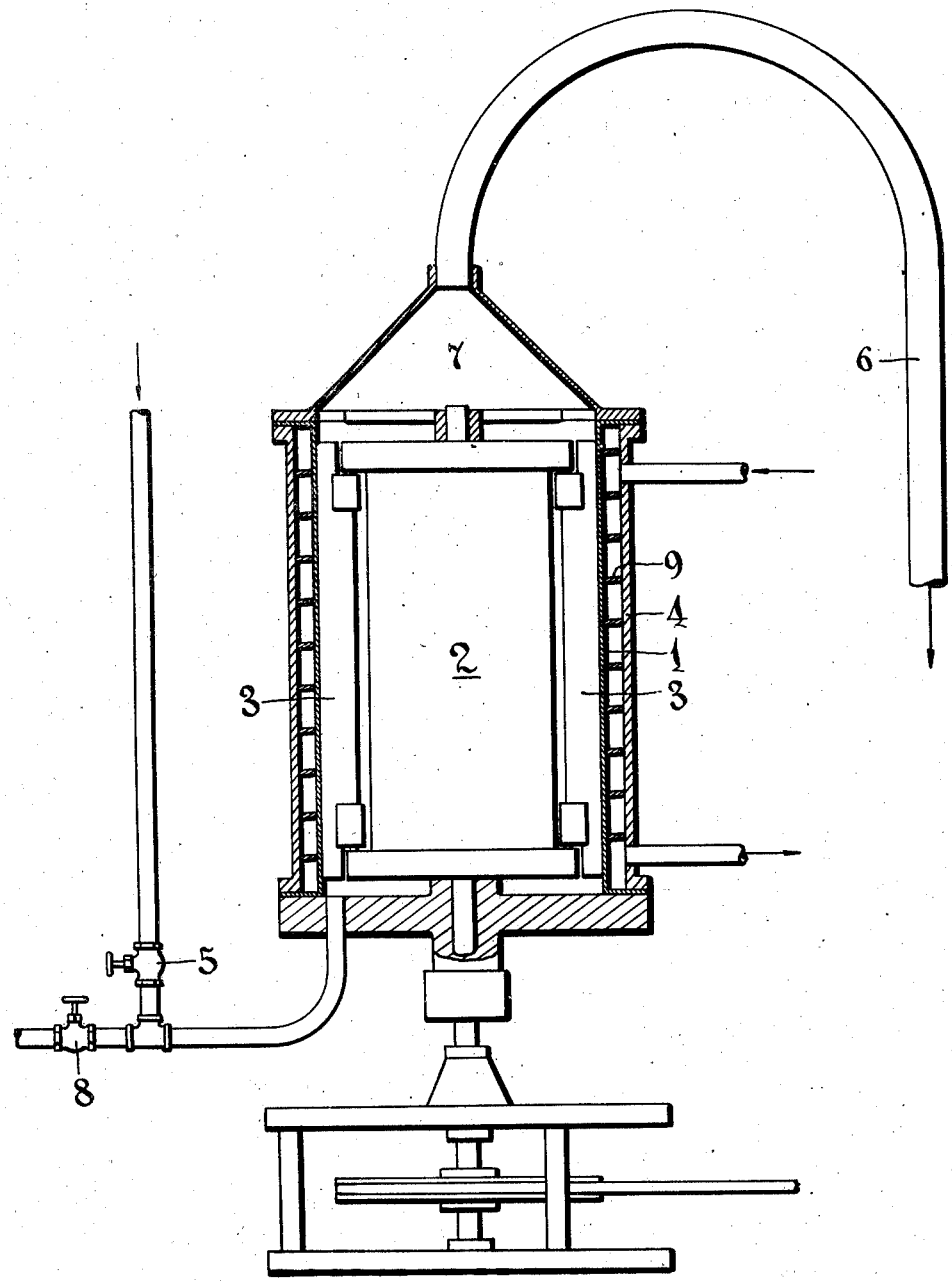

METHOD AND APPARATUS FOR CONDENSING LIQUIDS BY FREEZING

Paul Schuftan, Hollriegelskreuth, near Munich, and Hans Ranke, Solln, near Munich, Germany Application February 3, 1936, Serial No. 62,214
In Germany February 18, 1935

10 Claims. (Cl. 62—124)

In the commercial application of known processes for condensing liquids, such as salt solutions, milk, fruit juices and the like by freezing out water, difficulties are encountered particularly in that when the liquid is agitated in contact with the cooling surfaces for the purpose of securing a sufficiently rapid heat transfer to permit the treatment of a suitable volume of liquid in an apparatus of a given size, the ice crystallizes out in such finely divided form that its separation from the concentrated liquid is difficult and inefficient. This is particularly true when the condensing process is applied to an already relatively concentrated liquid. Moreover, in spite of vigorous movement of the liquid in contact with the cooling surfaces, the heat transfer rate is not as great as might be expected.

It has been found that the process is greatly improved with respect to both the heat transfer rate and the formation and separation of ice crystals by freeing the solution from gas and preventing the admission of air or other gas to the solution during its treatment. The reason for the results obtained by the exclusion of gas from the solution may be that otherwise the gas dissolved in the solution exceeds the solubility limit due to the concentration of the solution and separates due to the agitation of the solution in the form of fine bubbles or films which interfere with the heat transfer and with the growth of larger crystals. As stated, it has been found that when gas is carefully excluded from the solution during the condensing treatment, not only the heat transfer from the solution to the cooling surfaces is greatly improved, but large grained crystals are formed which are readily separated. Furthermore the movement of the liquid may be increased to an extent which otherwise would result in objectionable foaming and this increased movement of the liquid further improves the heat transfer. It has been found that the rate of heat transfer may be increased from 10 to 100 times without objectionable foaming or any difficulty in the separation of ice from the concentrated liquid. For a full utilization of the high heat transfer rates attainable, the brine used for cooling the heat transfer surfaces is circulated at such a high rate of speed in contact with said surfaces that the critical Reynolds number is exceeded and the movement of the cooling brine is turbulent. The Reynolds number, $R_e$, is defined by the equation $$R_e = \frac{w \cdot d}{\gamma}$$

in which $w$ is the mean velocity of the liquid, $d$ is the diameter of the conduit or vessel in which the motion occurs, and $\gamma$ is the kinetic viscosity (viscosity per unit mass) of the liquid (see Der Chemie-Ingenieur, Eucken Jakob, Vol. 1, part 1, page 26 and following).

The solution to be condensed may be degasified by any of the known methods and the exclusion of air from the solution during its treatment may be accomplished very simply by, e. g. closing the freezing vessel and completely filling it with the solution and discharging the ice through a pipe in such a way that it provides a seal against access of air to the solution.

The invention will be described in detail in connection with the condensation of milk in the apparatus illustrated in the accompanying drawing. Referring to the drawing, the apparatus comprises a cooling vessel 1 provided with the cooling jacket 4. The refrigerant, e. g. brine or a gaseous cooling agent, is circulated between the outer wall of the vessel 1 and the jacket 4 and is caused to move spirally in said space by the spirally arranged vane 9 and when brine or other liquid is used as the cooling agent it is caused to move at such a speed that the critical Reynolds number is exceeded and its movement is turbulent. Within the freezing vessel 1 is the displacement member 2 which is mounted on a vertical axis to be rotated by suitable driving means. The displacement member 2 carries the agitator members 3 which serve to intensively agitate the milk in the annular space between the wall of vessel 1 and the cylindrical displacement member 2. In operation the vessel is filled with liquid, e. g. milk, through the pipe controlled by the valve 5 up to the top of the cone 7 or even higher into the tube 6 so that the upper surface of the liquid is unaffected by the agitator and remains quiet and thus any mixing of the liquid with air or gas entering through the discharge tube 6 is avoided. If necessary the entrance of air through the tube 6 to contact with the agitated liquid may be prevented by the use of a U-tube or liquid seal.

The operation of the process is such that the liquid, e. g. milk, is continuously supplied to the vessel and ice mush is continuously discharged through the cone 7 and tube 6. The flow of milk and the temperature of the cooling wall are so adjusted that the formation of an adhering layer of ice on the wall of vessel 1 is avoided and on the other hand the ice mush collecting in the cone 7 is of such a consistency that it will flow or may be forced without excessive consumption of power out through the tube 6.

By the use of the displacement body 2 the volume of liquid under treatment is reduced with respect to the area of the cooling surface and the rate of flow of the liquid through the freezing space is increased. The cooling of the liquid may be intensified by making the surface of the displacement body also a cooling surface.

With highly viscous solutions, if the discharge of the ice mush should be difficult or require excessive pressure, its discharge may be facilitated by a screw or propeller agitator arranged above the displacement member 2 or by replacing the conical member 7 by a pipe connected tangentially to the top of the freezing vessel.

The ice mush produced may be delivered into a centrifuge in which the concentrated liquid and the ice crystals are separated and the concentrate may be subjected to a repetition of the condensing operation under suitable conditions depending on its characteristics. The first application of the condensing process to the liquid generally may be carried out without degasification, but when the mother liquor is to be re-treated it must be degasified; otherwise the gases liberated during the first application of the condensing process will interfere with the transfer of heat and impair the quality of the ice produced. The degasification may have to be repeated before each successive application of the condensing process to the mother liquor. In some cases, for instance, when the gas content of the original liquid is high, it may be necessary to degasify it before the first application of the condensing process. The degasification has been found to be advantageous even in instances in which the presence of gas does not result in the formation of foam.

An advantageous procedure in the condensation of liquids to a high concentration which otherwise would involve a number of repetitions of the condensing process on the mother liquor is to mix a concentrate of the desired final concentration with fresh solution in such proportions that the resulting mixture can be brought to the desired final concentration by a single application of the condensing process. For this purpose fresh solution entering through the pipe controlled by valve 5 may be mixed with mother liquor from a previous treatment supplied through the pipe controlled by valve 8. As will be apparent, this procedure may be carried on continuously with a continuous supply of fresh solution, a continuous withdrawal of a portion of the concentrate, and a continuous recycling of a portion of the concentrate.

The process herein described permits the removal of, for instance, more than one third of the water content of milk in a single stage and the attainment of heat transfer values of more than 5000 K cal./m. h. C. The process is capable of numerous variations some of which have been described and suggested so long as the essential features (1) that no gas is liberated from the liquid or absorbed in it during the agitation and cooling thereof, and (2) that the motion of the liquid in contact with the cooling surfaces shall be as vigorous as possible and in any event turbulent.

We claim:

1. In processes of condensing liquids involving moving a liquid in contact with a cooling surface and separating the resulting ice crystals from mother liquor, the improvement which consists in making the movement of the liquid in contact with the cooling surface turbulent, preventing the presence of emulsified gas in the liquid during its movement in contact with the cooling surface and adjusting the rate of movement of the liquid and the temperature of the cooling surface so as to prevent the formation of an adhering layer of ice on the cooling surface.

2. Process as defined in claim 1 in which the liquid is degasified prior to its contact with the cooling surface.

3. Process as defined in claim 1 in which contact of gas with the liquid while it is being agitated in contact with the cooling surface is avoided.

4. Process as defined in claim 1 in which the velocity of the liquid in contact with the cooling surface is such that the critical Reynolds number is exceeded.

5. Process as defined in claim 1 in which liquid to be concentrated is mixed with already concentrated liquid in such proportions that the desired final concentration of the mixture may be accomplished by a single passage of the mixture in contact with the cooling surface followed by separation of ice crystals.

6. Apparatus for the concentration of solutions by freezing out solvent comprising a cylindrical vessel, means for cooling the wall of said vessel, means for forcing liquid into said vessel adjacent the bottom thereof, an overflow pipe for the discharge of a mixture of ice and concentrate from the vessel, said overflow pipe forming a trap preventing access of air to the liquid in the vessel.

7. Apparatus for concentrating solutions by freezing out solvent comprising a cylindrical vessel having its longtudinal axis vertically disposed, a cylindrical displacement member rotatably mounted in said vessel with its surface concentric to the wall of said vessel, agitator members carried by said displacement member in the annular space between the displacement member and the wall of the vessel, means for rotating said displacement member, means for forcing liquid into the lower end of said vessel, and means for discharging fluid from the upper end of said vessel.

8. Apparatus as defined in claim 7 in which the means for discharging fluid from the upper end of the vessel comprises a liquid seal.

9. Apparatus as defined in claim 7 in which the means for discharging liquid from the upper end of the vessel comprises a frusto-conical member the larger end of which fits the upper end of the vessel.

10. Apparatus as defined in claim 7 in which the means for discharging liquid from the upper end of the vessel comprises means for positively moving mush ice.

PAUL SCHUFTAN.
HANS RANKE.

CERTIFICATE OF CORRECTION.

Patent No. 2,119,182. May 31, 1938.

PAUL SCHUFTAN, ET AL.

It is hereby certified that error appears in the printed specification of the above numbered patent requiring correction as follows: Page 2, second column, line 41, claim 6, after "vessel" and before the period insert and means for agitating the liquid within said vessel; and that the said Letters Patent should be read with this correction therein that the same may conform to the record of the case in the Patent Office.

Signed and sealed this 12th day of July, A. D. 1938.

(Seal)

Henry Van Arsdale,
Acting Commissioner of Patents.